Patented Nov. 15, 1938

2,136,481

UNITED STATES PATENT OFFICE 2,136,481

PROCESS OF OBTAINING VITAMIN-CONTAINING OILS

Ferdinand H. Young, Lake Bluff, and Hugh D. Robinson, North Chicago, Ill., assignors to Abbott Laboratories, North Chicago, Ill., a corporation of Illinois No Drawing. Application May 22, 1933, Serial No. 672,344

7 Claims. (Cl. 87—6)

The invention relates to a vitamin preparation particularly useful for its vitamin A content and to a process for obtaining the same.

One of the primary objects of this invention is to provide a product possessing a substantially higher vitamin A content than good medicinal cod liver oil. Another object is to provide such a product in the form of a stable, palatable and efficacious liquid product substantially free from disagreeable taste, odor, discoloring, and substantially free from many objectionable impurities such as fatty acids and nitrogenous bodies.

A further object is to make available as a commercial commodity a liquid vitamin preparation of such potency as to be effective in dosages measured in drops rather than in the standards such as teaspoonfuls commonly used heretofore.

Another object is to provide a process for obtaining products as above described adapted for operation on a large commercial scale while insuring high purity of the final product.

While the process is, in its broader aspects, adaptable for the extraction of vitamin-bearing oils or fats from various animal or vegetable products, it is particularly adaptable for extracting the vitamin content from fish livers and like products. It also finds its greatest utility in the preparation of a high vitamin A oil from halibut livers. Therefore we will first describe the process in its preferred form when used in extracting halibut livers.

The halibut livers when removed from the fish must be kept fresh by maintaining them at a low temperature, but they are preferably not subjected to a freezing temperature. The first step in the process is to place the fresh halibut livers in a tank containing water at sufficient temperature to cause disintegration of the levers with the coagulation of the proteins. In the preferred process the livers are placed in a tank to which is added hot water at 82° C. The temperature of the water is lowered by contact with the cool livers but it is again brought up to the required degree by injecting live steam while thoroughly stirring. Preferably the steam is introduced until the temperature reaches 85° C. At this point there is added sufficient alkali such, for example, as sodium hydroxide to neutralize the free fatty acids. The exact amount of alkali added depends somewhat upon the chemical analysis of the halibut livers used, and in some instances one per cent alkali is sufficient. In general, however, it will be found satisfactory to add alkali in an amount equivalent to two and one-half per cent of the weight of the livers.

The temperature is thereupon increased by introduction of more live steam until a temperature of 90° C. is reached. The mass is stirred during the heating process which is maintained for about an hour. The stirring is then interrupted and the mass allowed to stand in the tank for at least two hours, at the end of which time the oil in the form of a semi-emulsion will have separated and be floating on the surface. The aqueous portion is drawn from beneath the oil and the emulsion placed in a suitable container for further treatment to break the emulsion and separate the oil.

Any suitable method of removing the oil from the emulsion may be employed, but preferably this comprises the addition of three volumes of a five per cent saline solution. This is mixed intimately by stirring for fifteen minutes and allowed to stand for two hours. This partially breaks the emulsion and washes the same free from alkali. The washing is preferably repeated a second time. The oil is then heated by steam to a temperature of 75° C. and placed in a centrifuge capable of revolving at high speeds (6400 R. P. M.). The oil removed from the centrifuge still contains traces of moisture and is somewhat hazy. To eliminate the moisture, the oil is placed in a tank and a suitable dehydrating agent added, such as anhydrous sodium sulphate. Agitation is continued for a period of twelve hours by suitable means while the oil is suitably protected from oxidation. The preferred method for agitation consists in introducing a current of carbon dioxide into the tank. A small quantity of filtering medium, such as a special grade of infusorial earth, may be added and the mixture passed through a filter press, thereby obtaining an oil in a clear form ready for medicinal use.

The product obtained by the above process is light in color, substantially free from disagreeable odor or taste, contains less than one per cent of free fatty acids, and less than one-tenth of one per cent of nitrogenous material. The product is golden yellow to amber in color and has very little fishy odor or taste. The product is highly potent since it contains not less than 32,000 U. S. P. X. vitamin A units per gram of oil as compared with standard cod liver oil which has but 400 such units per gram. The product also contains at least 2,000 A. D. M. A. vitamin D units per gram as compared with standard cod liver oil which has only 100 such units per gram. The product is adapted for oral administration and is of such high potency that a sufficient daily dose for ordinary purposes amounts to but a few drops of the liquid. It should also be noted that while the minimum vitamin potency has been indicated above, it is usual to obtain oil by means of our process which has a very much greater potency. In some cases the potency is as high as 300,000 U. S. P. X vitamin A units per gram. The vitamin D potency does not usually increase at the same rate as the vitamin A potency and it does not in ordinary cases exceed 6,000 A. D. M. A. vitamin D units per gram.

It is to be understood that while our process has referred specifically to certain preferred temperatures, the invention may be carried out at temperatures differing quite widely from those set forth. For example, it is possible to obtain an extraction at low temperatures by lengthening the time of exposure to the alkali. On the other hand, the temperature may in some instances be increased even above the boiling point. It is also to be noted that the use of saline in facilitating the breaking of emulsions is not essential especially where a very high speed centrifuge is used, or where a prolonged time for the separation may be allowed.
While we have given examples of the preferred embodiments of our invention, it is to be understood that various modifications may be made without departing from the spirit of the invention, and we therefore do not wish to be limited to the specific details of the processes except as indicated by the claims appended hereto.

What we claim as our invention is:

1. The process of extracting livers containing oils rich in vitamins A and/or D comprising treating said livers with a water solution, adding caustic alkali in amount sufficient to liberate the oil from the solid but insufficient to cause a substantial amount of saponification, causing an emulsion to separate from an aqueous solution and treating said emulsion to remove therefrom an oil high in vitamins A and/or D and containing substantial amounts of saponifiable oil.

2. The process of extracting halibut liver oil comprising treating the halibut liver with a water solution, adding caustic alkali in amount sufficient to break up the cell tissue and liberate the oil but insufficient to cause a substantially complete saponification of the oil, causing an emulsion to separate from an aqueous solution and treating said emulsion to remove therefrom an oil high in vitamins A and D and containing substantial amounts of saponifiable oil.

3. The process of extracting vitamin-containing oils or fats from fish products comprising treating the solid fish products with a water solution at a high temperature not substantially above the boiling point while maintaining a rapid agitation, adding caustic alkali in amount sufficient to break up the cell tissue and liberate the oil but insufficient to cause a substantially complete saponification of the oil, allowing the mass to stand until an emulsion separates from an aqueous solution and treating the emulsion to remove therefrom an oil high in vitamin content and containing substantial amounts of saponifiable oil.

4. The process of obtaining a highly purified high potency halibut liver oil comprising adding water to fresh halibut livers, maintaining the water at a high temperature not substantially above the boiling point thereof, adding an alkali metal hydroxide in quantity sufficient to substantially neutralize the free fatty acids, break up the cell tissue and liberate the oil but insufficient to cause a substantially complete saponification of the oil agitating the mass, allowing the mass to stand until an emulsion separates from an aqueous layer and treating said emulsion to remove therefrom a halibut liver oil of high potency and purity and containing substantial amounts of saponifiable oil.

5. The process of extracting livers containing oils rich in vitamins A and/or D comprising adding water to said livers, adding sufficient caustic alkali to substantially neutralize the fatty acids and insufficient to cause a substantial amount of saponification of the oil, causing emulsion to separate from an aqueous layer, adding a saline solution to said emulsion and separating the oil from said emulsion, thereby obtaining an oil high in vitamins A and/or D and containing substantial amounts of saponifiable oil.

6. The process of extracting livers containing oils rich in vitamins A and/or D comprising adding water to said livers, adding sufficient caustic alkali to substantially neutralize the fatty acids and insufficient to cause a substantially complete saponification of oil, causing an emulsion to separate from an aqueous layer, adding a saline solution to said emulsion, separating the oil from said emulsion and treating the oil thus obtained with a dehydrating agent, thereby obtaining an oil in a clear form ready for medicinal use and containing substantial amounts of saponifiable oil.

7. The process of extracting a highly purified high potency halibut liver oil comprising adding hot water to fresh halibut livers, injecting live steam into the mass until the temperature is substantially 85° C., adding caustic soda in an amount equivalent to approximately two and one-half per cent alkali on the basis of the weight of the livers, introducing steam into the mass until a temperature of approximately 90° C. is reached, allowing the mass to stand until an emulsion separates from an aqueous layer, adding a saline solution to said emulsion, heating the oil obtained therefrom to a temperature of approximately 75° C. and subjecting the same to a high speed centrifuge, treating the oil from said centrifuge with anhydrous sodium sulphate, adding a filtering medium and filtering through a filter press to obtain an oil suitable for medicinal use and containing substantial amounts of saponifiable oil.

FERDINAND H. YOUNG.
HUGH D. ROBINSON.